(12) United States Patent
Haraoka et al.

(10) Patent No.: US 6,898,801 B1
(45) Date of Patent: May 24, 2005

(54) TRANSMISSION APPARATUS AND METHOD, RECEIVING APPARATUS AND METHOD, AND DISTRIBUTION MEDIUM

(75) Inventors: Kazuo Haraoka, Tokyo (JP); Yoshihisa Gonno, Kanagawa (JP); Fumihiko Nishio, Tokyo (JP); Yasuaki Yamagishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/452,315

(22) Filed: Dec. 1, 1999

(30) Foreign Application Priority Data

Dec. 2, 1998  (JP) ............................................ 10-342586

(51) Int. Cl.⁷ ..................... H04N 7/20; H04N 7/173; H04N 7/16; H04J 1/00; G06F 15/16
(52) U.S. Cl. .................... 725/151; 725/67; 725/68; 725/87; 725/91; 725/93; 725/98; 725/114; 725/115; 725/116; 725/117; 725/118; 725/131; 725/136; 725/138; 725/139; 725/144; 725/146; 725/148; 370/487; 709/219; 709/231
(58) Field of Search ............................ 725/67, 68, 98, 725/118, 131, 138, 139, 148, 50, 87, 91, 93, 114, 116, 117, 136, 144, 146; 709/219, 231; 370/487

(56) References Cited

U.S. PATENT DOCUMENTS

| | | | | |
|---|---|---|---|---|
| 4,868,866 | A | * 9/1989 | Williams, Jr. | ................. 380/49 |
| 5,130,792 | A | * 7/1992 | Tindell et al. | ................. 358/85 |
| 5,761,438 | A | * 6/1998 | Sasake | ................... 395/200.77 |
| 5,886,731 | A | * 3/1999 | Ebisawa | ........................ 348/9 |
| 5,930,493 | A | * 7/1999 | Ottesen et al. | .............. 395/500 |
| 6,002,720 | A | * 12/1999 | Yurt et al. | ................... 375/240 |
| 6,085,235 | A | * 7/2000 | Clarke, Jr. et al. | ........... 709/219 |
| 6,115,035 | A | * 9/2000 | Compton et al. | ............ 345/327 |
| 6,157,948 | A | * 12/2000 | Inoue et al. | ................. 709/219 |
| 6,344,878 | B1 | * 2/2002 | Emura | ........................ 348/460 |
| 6,363,380 | B1 | * 3/2002 | Dimitrova | ....................... 707/6 |
| 6,493,877 | B1 | * 12/2002 | Yamazaki et al. | ........... 725/100 |
| 6,609,251 | B1 | * 8/2003 | Yoneda | ........................ 725/71 |
| 2001/0016944 | A1 | * 8/2001 | Terakado et al. | ............. 725/43 |

* cited by examiner

*Primary Examiner*—Vivek Srivastava
*Assistant Examiner*—Son P. Huynh
(74) *Attorney, Agent, or Firm*—Frommer Lawrence & Haug LLP; Wiiliam S. Frommer; Darren M. Simon (57) ABSTRACT

In order to reduce the amount of data to be transmitted by a transmission apparatus, the transmission apparatus transmits control sub-information to a receiving apparatus separately from video data which is actually distributed, and eliminates redundant distribution of video data. The receiving apparatus stores the received video data and creates content in accordance with the control sub-information.

6 Claims, 11 Drawing Sheets

TRANSMISSION APPARATUS AND METHOD, RECEIVING APPARATUS AND METHOD, AND DISTRIBUTION MEDIUM

BACKGROUND OF THE INVENTION

1. Field of the Invention

The present invention relates to a transmission apparatus and method, a receiving apparatus and method, and a distribution medium. More particularly, the present invention relates to a transmission apparatus and method and to a receiving apparatus and method, in which transmission data is divided, and the data is transmitted by creating information which specifies viewing relationships among divided signals so that the data received by the receiving apparatus can be processed by the receiving apparatus without the transmission apparatus having to retransmit the data again, and to a distribution medium therefor.

2. Description of the Related Art

Figure 12:
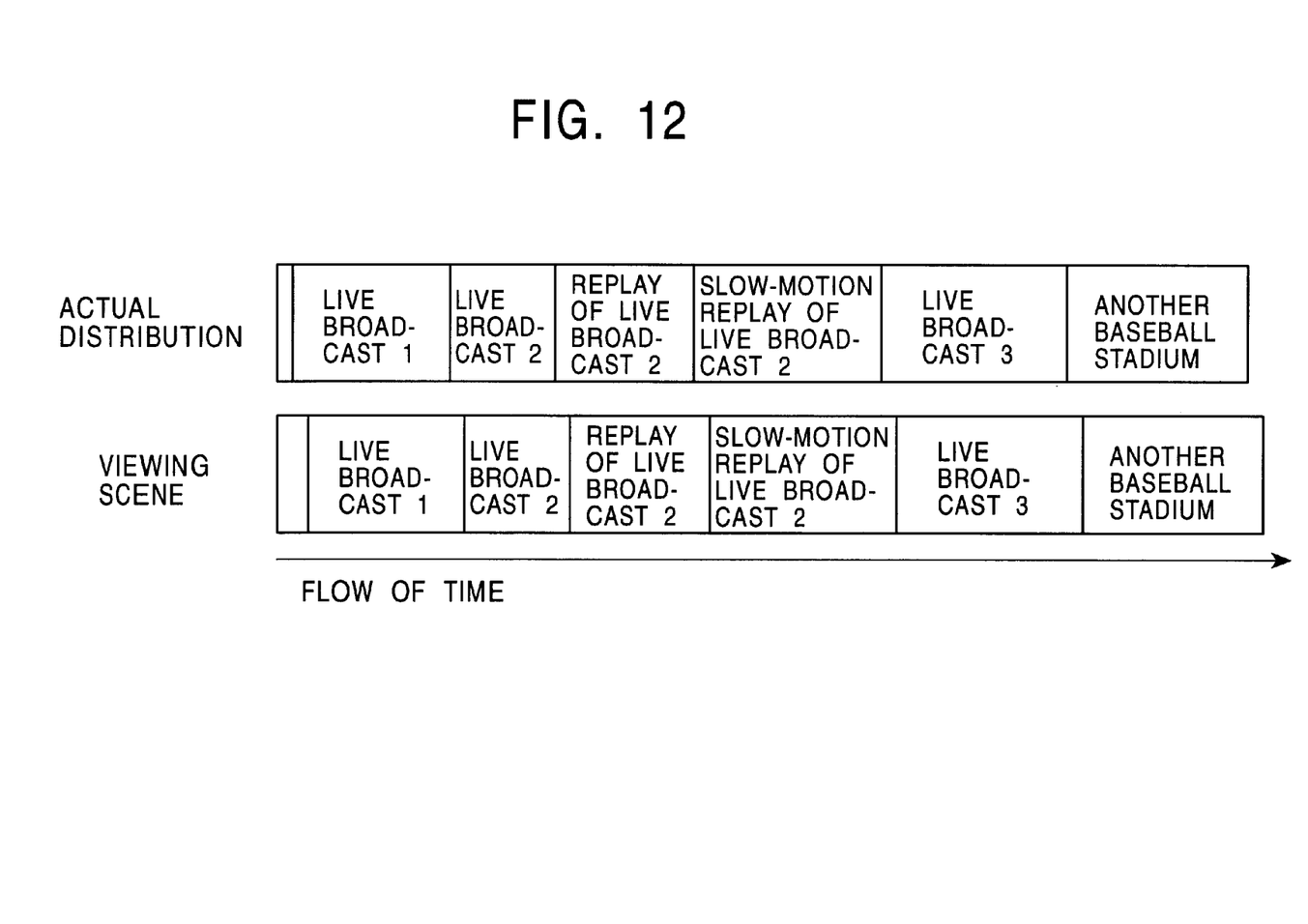
FIG. 12 is an illustration of data which is distributed by a conventional transmission apparatus and viewing data which is test-listened by a conventional receiving apparatus.

Conventionally, in digital broadcasting, the transmission content of a transmission party (for example, a broadcasting station) and the content received by a receiving party (for example, a household user) are the same. FIG. 12 is a view showing the transmitted and the received content in a case in which the transmission party transmits a live relay broadcast of a baseball game, and the receiving party receives it.

A baseball broadcast in FIG. 12 is composed of six items of viewing data (hereinafter referred to as the "content"): a live broadcast 1, a live broadcast 2, a replay of the live broadcast 2, a slow-motion replay of the live broadcast 2, a live broadcast 3, and a relay broadcast from another baseball stadium. When the transmission party transmits the content of the live broadcast 1, the receiving party receives the content of the live broadcast 1 by a receiving apparatus (for example, a television receiver) and views it. Next, the content of the live broadcast 2 is transmitted and is received. When transmitting a replay of the live broadcast 2 after transmitting the content of the live broadcast 2, the transmission party transmits the content of the live broadcast 2 again. When transmitting the slow-motion video of the live broadcast 2, the transmission party creates slow-motion content by lowering the bit rate of the content of the live broadcast 2 and transmits it. Since the content of the live broadcast 3 and the relay from another baseball stadium are the same as that of the live broadcast 1, descriptions thereof are omitted. That is, the transmission party produces all the content which is received and viewed by the receiving party and transmits it.

As described above, in conventional broadcasting systems, the transmission party transmits the content as it is to be received by the receiving party. As a result, all content to be received by the receiving party must be transmitted by the transmission party, and the total amount of information to be transmitted is large and a digital communication band cannot be used effectively.

SUMMARY OF THE INVENTION

The present invention has been achieved in view of such circumstances. It is an object of the present invention to reduce the amount of video data transmitted by a transmission apparatus, thereby effectively using a digital communication band by storing content received by a receiving apparatus and by using the content stored in the receiving apparatus when the received content is used again.

To achieve the above-mentioned object, according to a first aspect of the present invention, there is provided an transmission apparatus comprising: an addition unit for dividing a transmission signal and for adding indicators to the divided signals; a creation unit for creating information which specifies viewing relationships among the respective divided signals; and a transmission unit for transmitting the divided signals to which indicators are added by the addition unit and the information created by the creation unit.

According to a second aspect of the present invention, there is provided a transmission method comprising: an addition step for dividing a transmission signal and for adding indicators to the divided signals; a creation step for creating information which specifies viewing relationships among the respective divided signals; and a transmission step for transmitting the divided signals to which indicators are added in the addition step and the information created in the creation step.

According to a third aspect of the present invention, there is provided a distribution medium for providing a processor-readable program to a transmission apparatus for transmitting digital signals, the program comprising: an addition step for dividing a transmission signal and for adding indicators to the divided signals; a creation step for creating information which specifies viewing relationship among the respective divided signals; and a transmission step for transmitting the divided signals to which indicators are added in the addition step and the information created in the creation step.

According to a fourth aspect of the present invention, there is provided a receiving apparatus comprising: a receiving unit for receiving divided signals and information which specifies viewing relationships among the divided signals; a storage unit for storing the divided signals received by the receiving unit, and the information; and a construction unit for reconstructing the divided signals stored by the storage unit in accordance with the information.

According to a fifth aspect of the present invention, there is provided a receiving method for receiving digital signals, the receiving method comprising: a receiving step for receiving divided signals and information which specifies viewing relationships among the divided signals; a storing step for storing the divided signals received in the receiving step, and the information; and a construction step for reconstructing the divided signals stored in the storing step in accordance with the information.

According to a sixth aspect of the present invention, there is provided a distribution medium for providing a processor-readable program to a receiving apparatus for receiving digital signals, the program comprising: a receiving step for receiving divided signals and information which specifies viewing relationships among the divided signals; a storing step for storing the divided signals received in the receiving step, and the information; and a construction step for reconstructing the divided signals stored in the storing step in accordance with the information.

The above and further objects, aspects and novel features of the invention will become more apparent from the following detailed description when read in connection with the accompanying drawings.

DESCRIPTION OF THE PREFERRED EMBODIMENT

Figure 1:
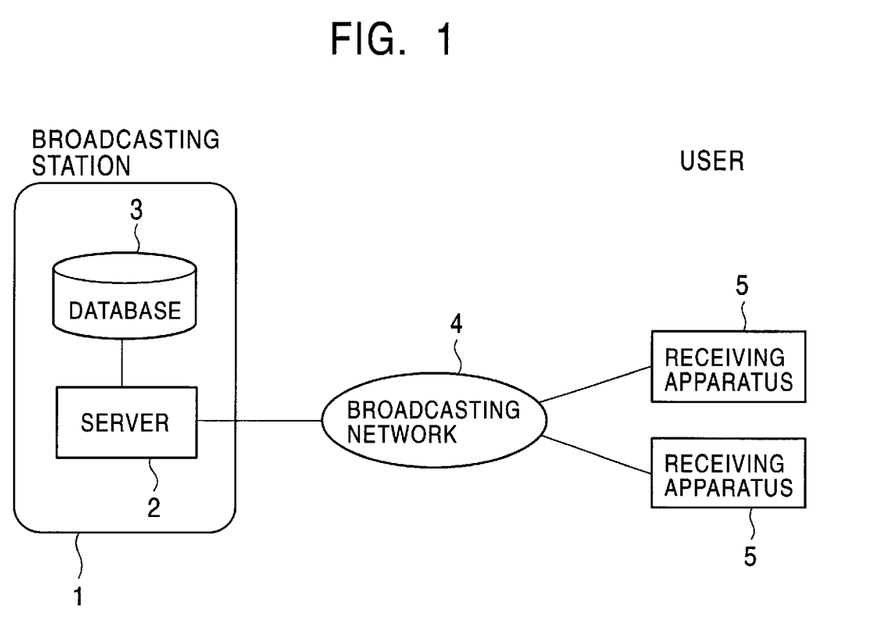
FIG. 1 is a block diagram showing an example of the construction of a broadcast system to which the present invention is applied.

FIG. 1 shows an example of the construction of a broadcast system to which the present invention is applied. A server 2 inside a transmission apparatus 1 obtains necessary video data from a database 3, creates content, and outputs it to a broadcasting network 4. The database 3 has video data required to create the content stored therein. The broadcasting network 4 is a network, such as a digital satellite broadcast or a digital terrestrial broadcast, which is capable of broadcasting to a large number of users. A receiving apparatus 5 is a receiving apparatus, such as a television receiver, which is capable of receiving a digital broadcast.

Figure 2:
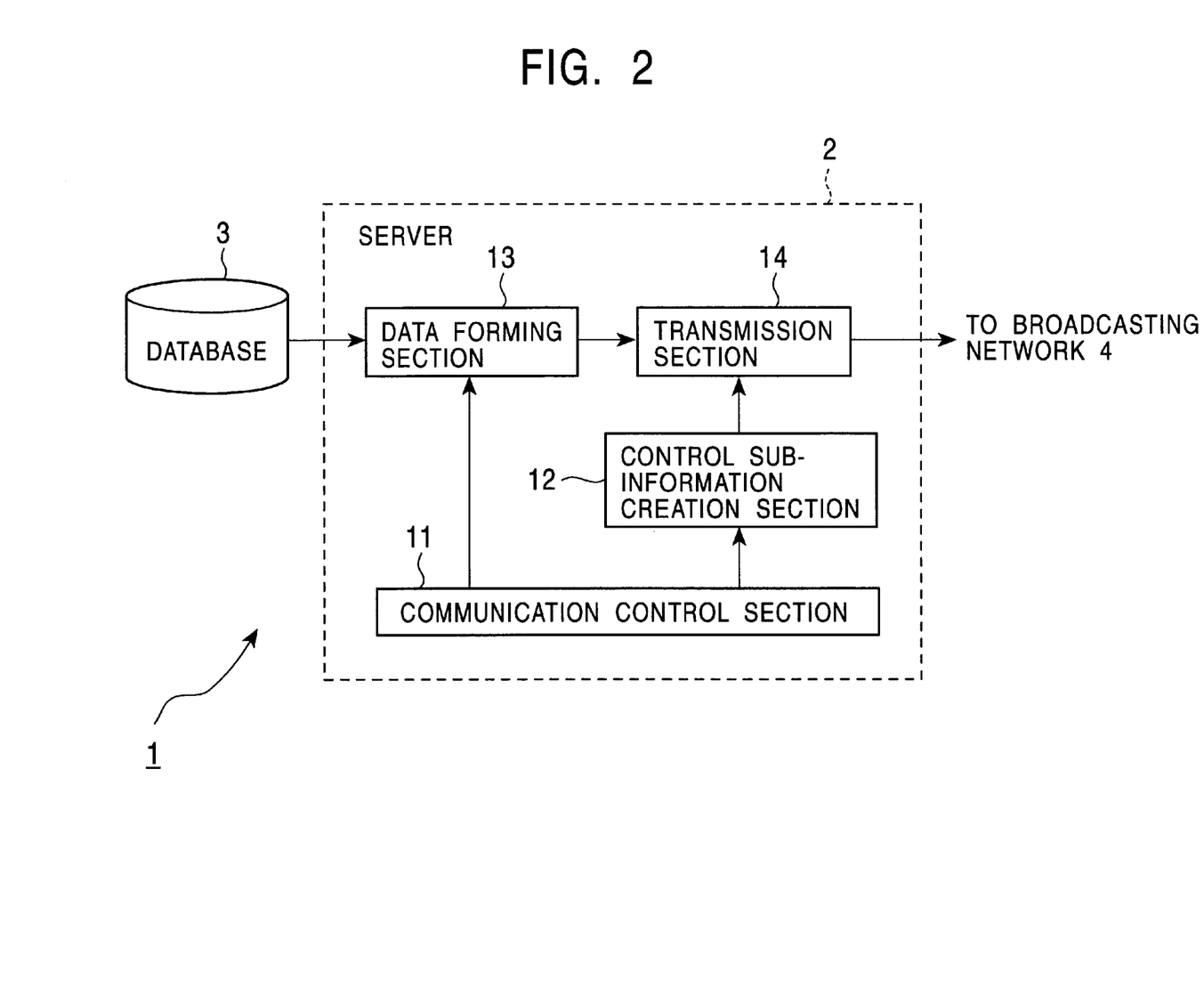
FIG. 2 is a block diagram showing an example of the construction of a transmission apparatus 1 of FIG. 1.

FIG. 2 shows an example of the construction of the transmission apparatus 1. A communication control section 11 outputs information required to create content to a control sub-information creation section 12 and a data forming section 13 so that the entire transmission apparatus 1 is controlled. The control sub-information creation section 12 creates information (hereinafter referred to as "control sub-information") required (which specifies the viewing relationships) to create content by reconstructing, by the receiving apparatus 5, main information in which content which is actually displayed (for example, transport stream signals encoded by an MPEG2 method) on the display screen (not shown) of the receiving apparatus 5 differs from continuous transmission data (hereinafter referred to as "main information"). The process of reconstructing and creating content on the basis of the control sub-information in the receiving apparatus 5 will be described later with reference to the flowchart of FIG. 5. The control sub-information may be based on the same coding method (for example, the MPEG2 method) as that for the main information, or may be based on a coding method which differs from that for the main information.

The data forming section 13 obtains necessary video data from the database 3 in accordance with instructions from the communication control section 11, and adds an indicator (hereinafter referred to as a "tag") to each piece of video data, creating main information. The "tag" specifies the unit of the video data; for example, the actual start time of the video data is written. A transmission section 14 transmits content and control sub-information corresponding to each of the contents earlier than the actual start time at which the content is to be viewed. Since the control sub-information specifies the relationships among the respective contents (for example, the broadcasting sequence of the contents of the broadcast program) and the use mode (for example, slow-motion replay) of the content, the control sub-information is not necessarily transmitted together with the content; for example, in the case of a rebroadcast (i.e., all the content has already been transmitted), only the control sub-information is transmitted.

Figure 3:
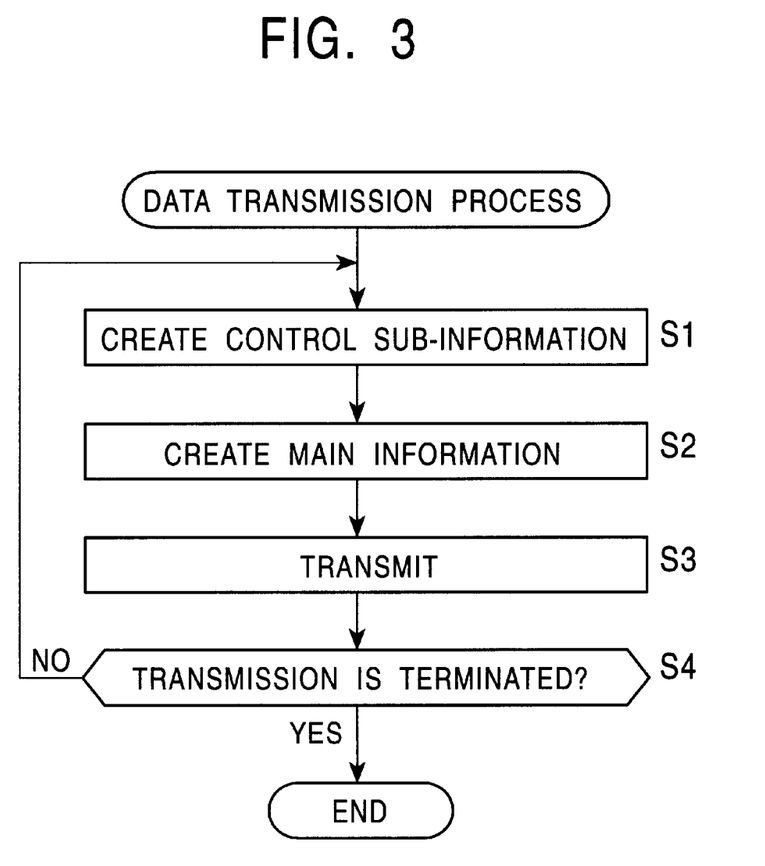
FIG. 3 is a flowchart illustrating the processing of the transmission apparatus 1 of FIG. 1.

Next, the operation of the transmission apparatus 1 is described with reference to the flowchart of FIG. 3. In step S1, the control sub-information creation section 12 reconstructs main information in the receiving apparatus 5 in accordance with instructions from the communication control section 11 in order to create control sub-information for creating content. In step S2, the data forming section 13 obtains necessary video data from the database 3 in accordance with instructions from the communication control section 11 in order to create main information.

In step S3, the transmission section 14 transmits the control sub-information created in step S1 and the main information created in step S2 to the broadcasting network 4. When the entirety of the main information has been transmitted (for example, a news program, etc., the content of which is not changed) to the receiving apparatus 5, the transmission section 14 transmits only the control sub-information created in step S1.

In step S4, the communication control section 11 determines whether or not the entirety of the main information and the control sub-information in the broadcast has been transmitted to the broadcasting network 4. When it is determined by the communication control section 11 that the entirety of the main information and the control sub-information has not been transmitted to the broadcasting network 4, the process returns to step S1, and the processing of step S1 and subsequent steps is repeated. When it is determined by the communication control section 11 that the entirety of the main information and the control sub-information has been transmitted to the broadcasting network 4, the transmission process is terminated.

Figure 4:
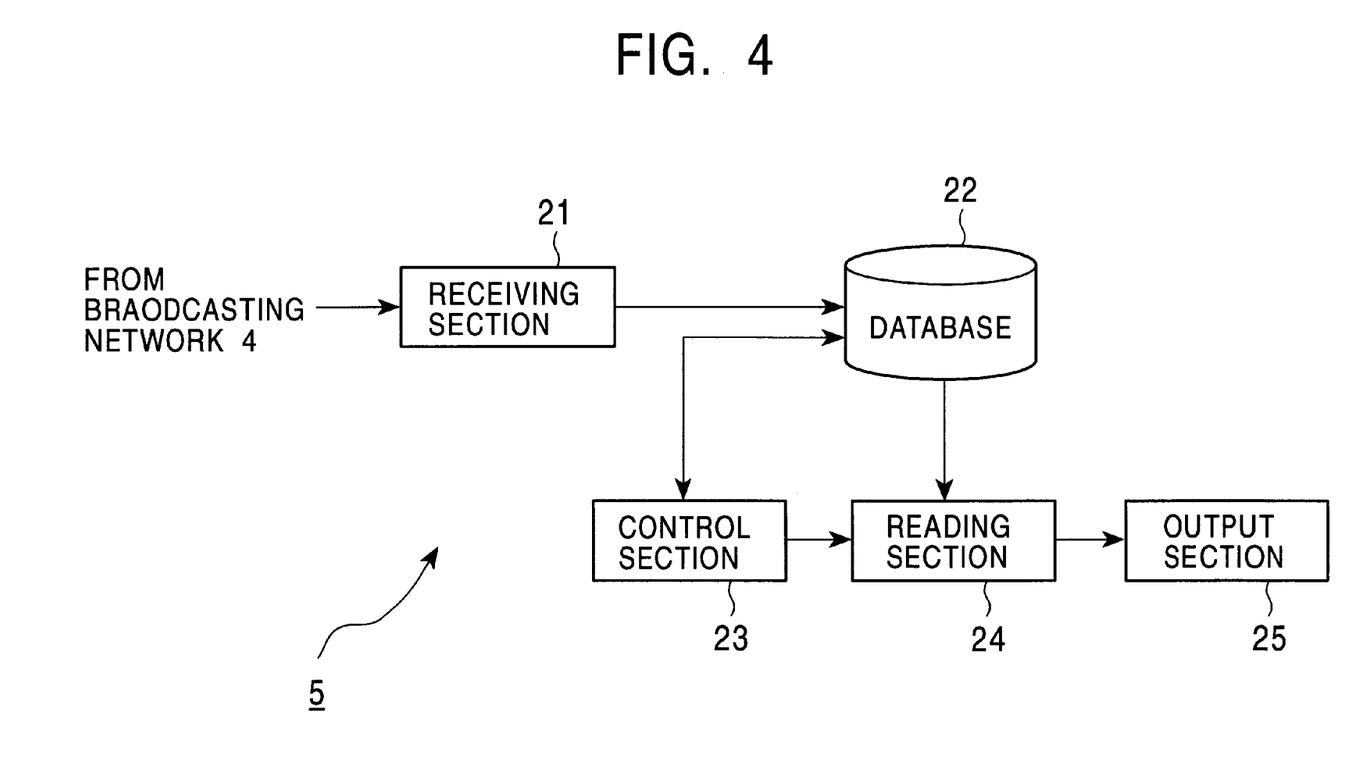
FIG. 4 is a block diagram showing an example of the construction of a receiving apparatus 5 of FIG. 1.

FIG. 4 shows an example of the construction of the receiving apparatus 5. A receiving section 21 identifies main information and control sub-information which are input via the broadcasting network 4, and outputs them to a database 22. The database 22 stores the main information and the control sub-information, which are input from the receiving section 21, separately from each other. A control section 23 obtains the control sub-information from the database 22 and generates a signal for controlling a reading section 24 in accordance with the control sub-information. The reading section 24 obtains necessary video data from the database 22 in accordance with a control signal from the control section 23, and performs processing (for example, slow-motion processing) thereon as required in order to create content. An output section 25 outputs the content created by the reading section 24 to the display screen (not shown) of the receiving apparatus 5.

Figure 5:
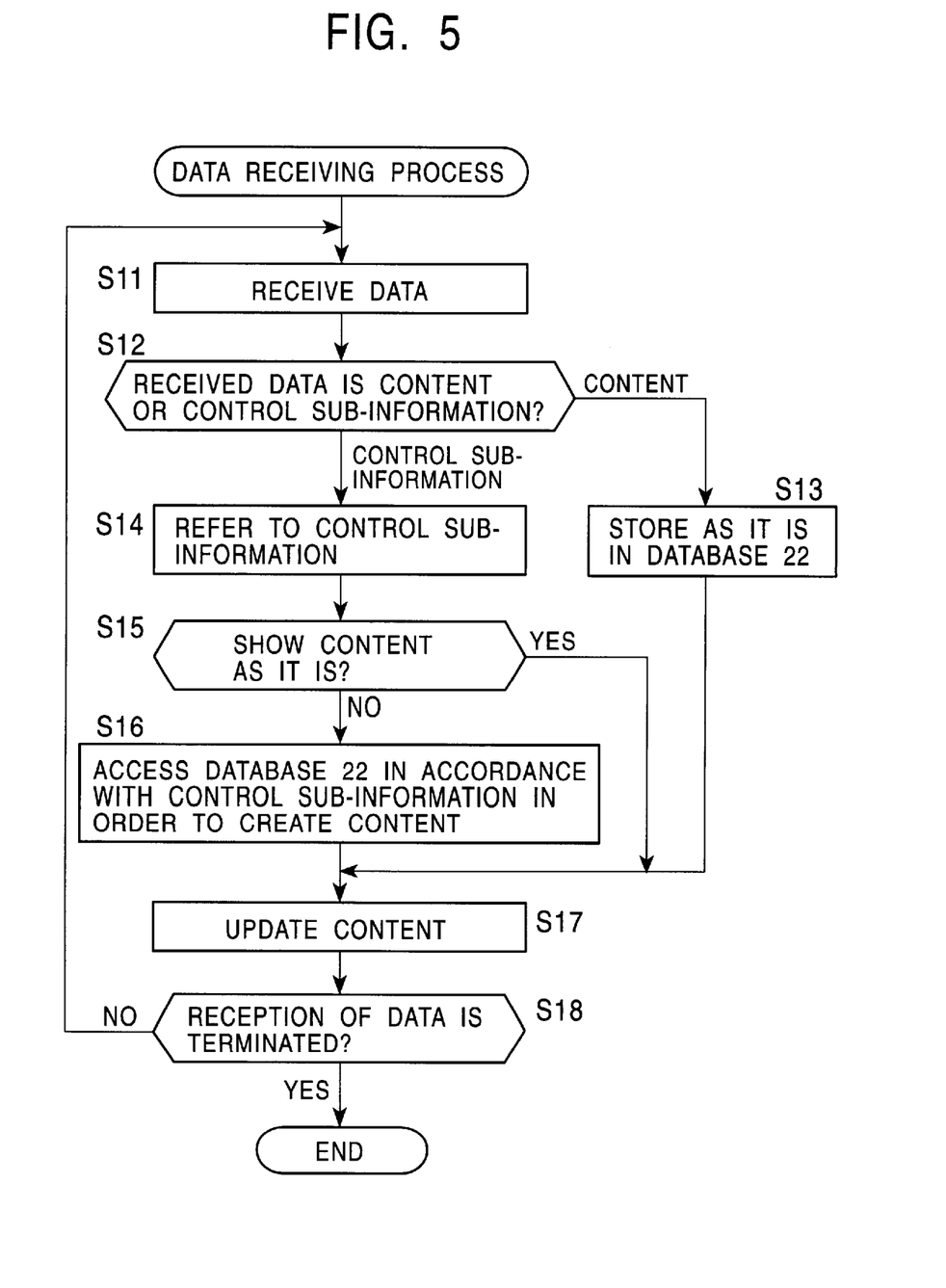
FIG. 5 is a flowchart illustrating the processing of the receiving apparatus 5 of FIG. 1.

Next, the receiving operation of the receiving apparatus 5 is described with reference to the flowchart of FIG. 5. In step S11, the receiving section 21 receives main information and control sub-information from the broadcasting network 4. In step S12, the receiving section 21 determines whether or not the received data is content or control sub-information. When it is determined that the received data is content, in step S13, the receiving section 21 causes the content to be stored as it is in the database 22. When it is determined in step S12 that the received data is control sub-information, in step S14, the receiving section 21 causes the control sub-information to be stored in the database 22.

In step S14, the control section 23 reads the control sub-information stored in the database 22, and in step S15, the control section 23 determines whether or not the content stored in the database 22 should be shown as it is as a viewing scene (frames) in accordance with the control sub-information read in step S14. When it is determined in step S15 that the content stored in the database 22 should not be shown as it is, in step S16, the control section 23 accesses the database 22 in accordance with the control sub-information read in step S14, and outputs an instruction for creating content which should be shown in a viewing scene to the reading section 24. When it is determined by the control section 23 that the content should be shown as it is, the process of step S16 is skipped, and the process proceeds to step S17.

In step S17, the reading section 24 reads, from the database 22, the content indicated by the control sub-information when it is determined in step S15 that the content should be shown as it is, and updates the content. When an instruction for creating content is received in step S16, the reading section 24 obtains necessary video data (processes the video data as required) from the database 22 in accordance with the control sub-information, and updates the content. In step S18, the control section 23 determines whether or not all the data of the broadcast program has been received. When it is determined that all the data of the broadcast program has not been received, the process returns to step S11, and the processing of step S11 and subsequent steps is repeated. When it is determined by the control section 23 that all the data of the broadcast program has been received, the process of receiving data is terminated.

Figure 6:
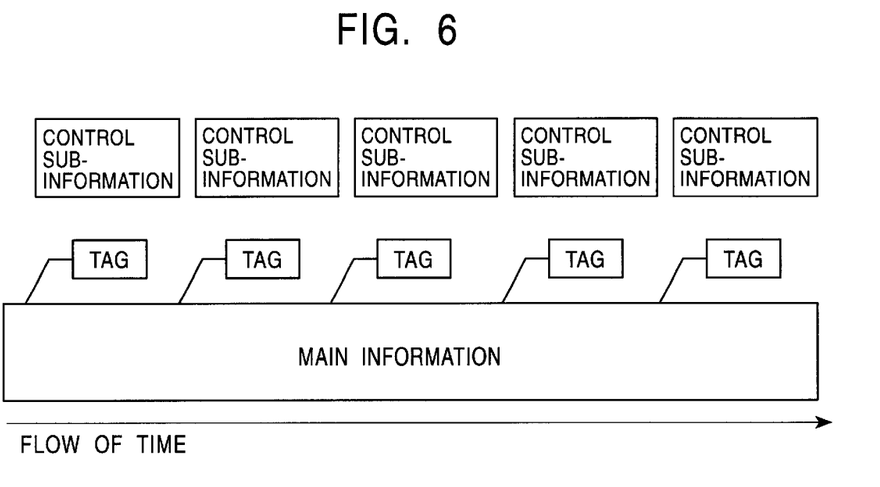
FIG. 6 is an illustration of the construction of data which is transmitted by the transmission apparatus 1.

FIG. 6 shows data to be actually transmitted by the transmission apparatus 1. The data which is actually transmitted is main information and control sub-information. The main information is video data encoded by the MPEG2 method, etc., and a tag is added to each piece of video data by the data forming section 13. The control sub-information is distributed for each of the contents in the viewing scene in the receiving apparatus 5.

Figure 7:
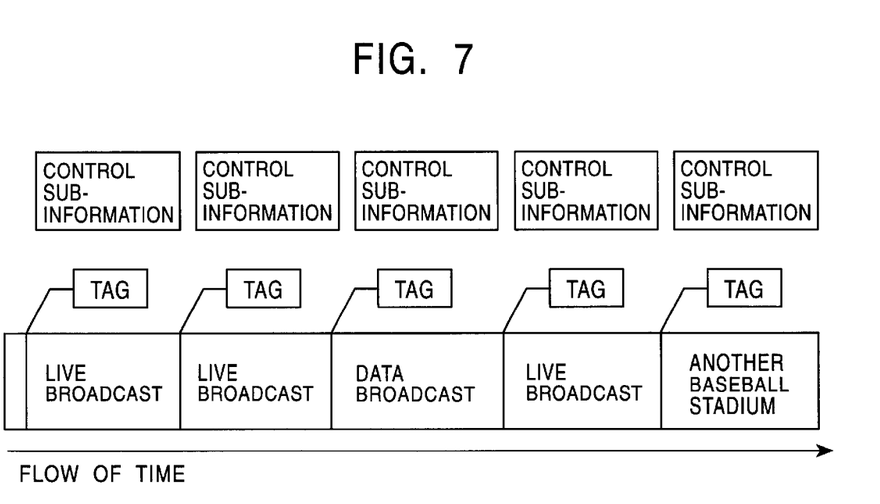
FIG. 7 is an illustration of a detailed construction of data which is transmitted by the transmission apparatus 1.

FIG. 7 shows in detail the content of the main information of FIG. 6. The main information is composed of video data of three live broadcasts and video data from another baseball stadium. A tag is added to each of the video data. The data of the "data broadcast" shown in the figure is data (for example, data for a new program which will be broadcast later) which is not directly related to the program currently being broadcast.

Figure 8:
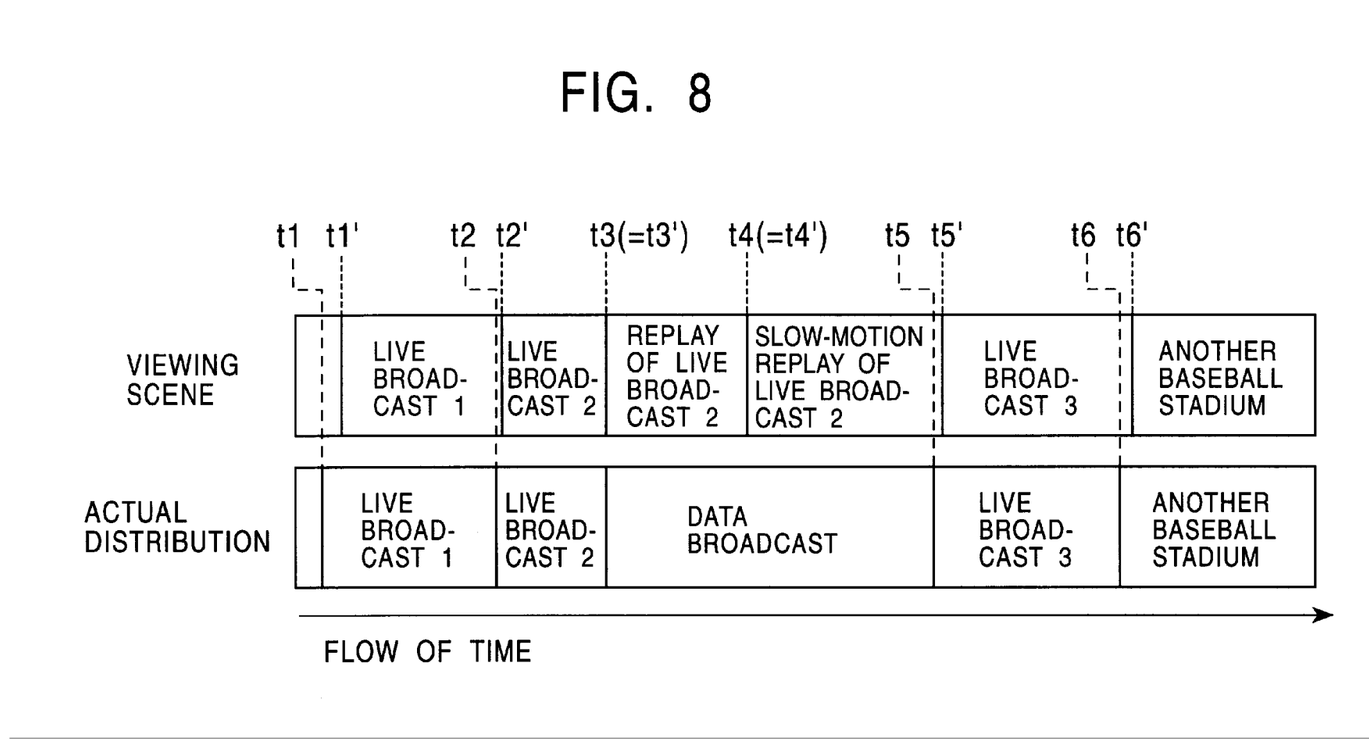
FIG. 8 is an illustration of data which is distributed by the transmission apparatus 1 and viewing data which is test-listened by the receiving apparatus 5.

FIG. 8 shows video data which is actually distributed, and a viewing scene in which the video data contains content which is created in accordance with control sub-information, in a live broadcast. The actually distributed video data is similar to that for the case of FIG. 7, and accordingly, description thereof is omitted. The video data of the live broadcast 1, distributed at time t1, is broadcast as it is at time t1 in accordance with the instruction of the control sub-information. Next, the video data of the live broadcast 2, distributed at time t2, is broadcast as it is at time t2', in a manner similar to that for the video data of the live broadcast 1.

The contents at times t3 and t4 are created from the video data of the live broadcast 2 distributed at time t2 in the receiving apparatus 5 in accordance with the control sub-information because the video data for the live broadcast currently being broadcast is not actually distributed (in FIG. 8, the portion written as "data broadcast"). The content at time t3 shows the results in which the control sub-information specifies that the video data of the live broadcast 2 is to be replayed. The content at time t4 shows the result in which the video data of the live broadcast 2 is specified to be slow-motion-processed and replayed. That is, the reading section 24 of the receiving apparatus 5 reads the video data of the live broadcast 2, stored in the database 22, in accordance with an instruction from the control section 23, and the video data is replayed as it is and is slow-motion-processed, thereby creating the content. Therefore, from time t3 to time t5, the transmission apparatus 1 does not need to distribute the video data for the live broadcast which is currently being broadcast. Also, the content specified by the reading section 24 in accordance with the control sub-information is not limited to video data and may be only audio information.

The video data of the live broadcast 3 at time t5 and the content based on the video data from another baseball stadium at time t6 are the same as the video data of the live broadcast 1 at time t1, and accordingly, descriptions thereof are omitted.

Figure 9:
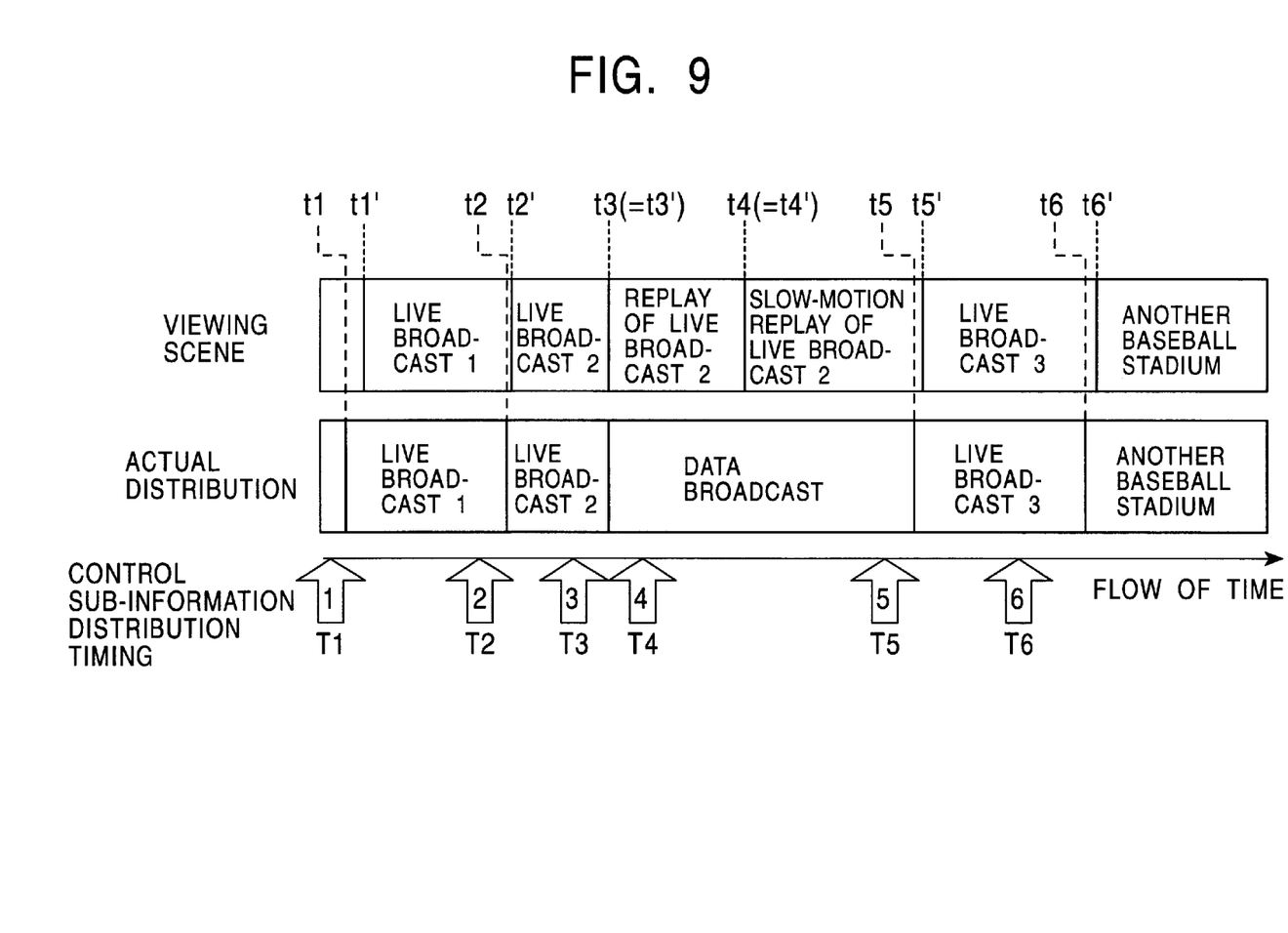
FIG. 9 is an illustration of the distribution timing of control sub-information.

FIG. 9 shows the distribution timing of control sub-information. One set of control sub-information is distributed for each content in the viewing scene. The control sub-information must be distributed at an earlier stage than the viewing scene. That is, the control sub-information, which instructs that the video data of the live broadcast 1 distributed at time t1 be broadcast at time t1 as it is, is distributed at time T1 earlier than time t1'. The same also applies for the distribution times T2 to T6 of the control sub-information from times t2 to t6. The time T1 need only be a time earlier than time t1', and the intervals, etc., are not particularly specified.

Furthermore, when the entire content of the broadcast program has been received (for example, a rebroadcast, a news program, etc., the content of which is not changed) by the receiving apparatus 5, the receiving apparatus 5 constructs a program from the content stored in the database 22 in accordance with the control sub-information distributed from time T1 to time T6 in order to create a viewing scene.

Figure 10:
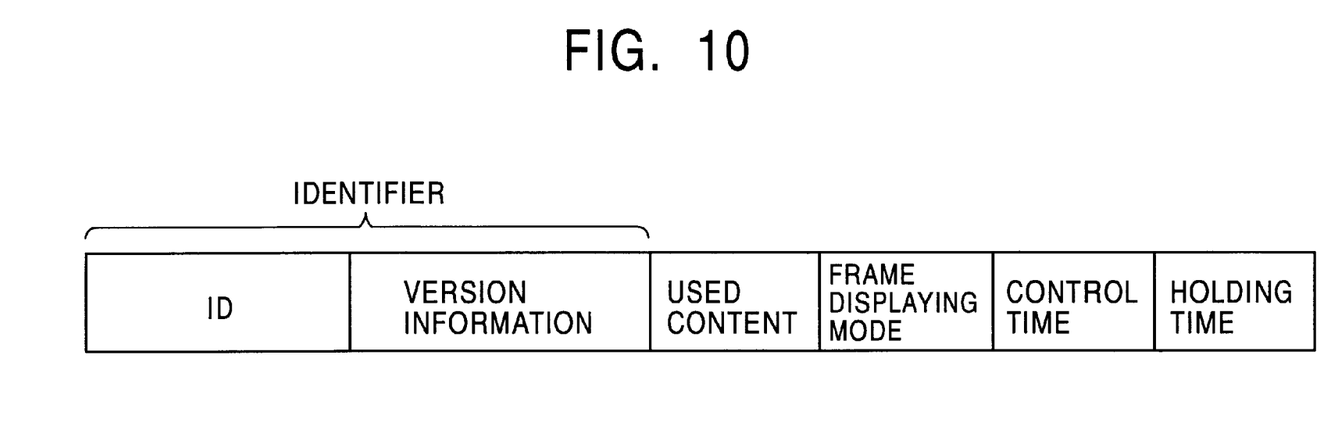
FIG. 10 is an illustration of the content of control sub-information.

FIG. 10 shows an example of the content of control sub-information. ID (identifier) is an identifier which indicates a broadcast program, and version information indicates which control sub-information in the sequence of the broadcast program (for example, the control sub-information at time T1 of FIG. 9 is the first control sub-information in the baseball relay broadcast). The content used indicates video data (for example, the video data of the live broadcast 2 at time t2 which is broadcast at time t3) used in the viewing scene, and the frame displaying mode indicates a method of displaying (for example, slow-motion replay) content used. The control time indicates the time (for example, time t1' of FIG. 9) at which the video data indicated by the content used is broadcast in the viewing scene, and the holding time indicates the difference between the broadcast time of the video data in accordance with the previous control sub-information and the broadcast time of the video data in accordance with the control sub-information at this time. However, the broadcast time of the video data in accordance with the control sub-information at this time may not be written. That is, when data for the live broadcast is to be broadcast as it is, it is common for the end of one content to not be determined beforehand.

Figure 11:
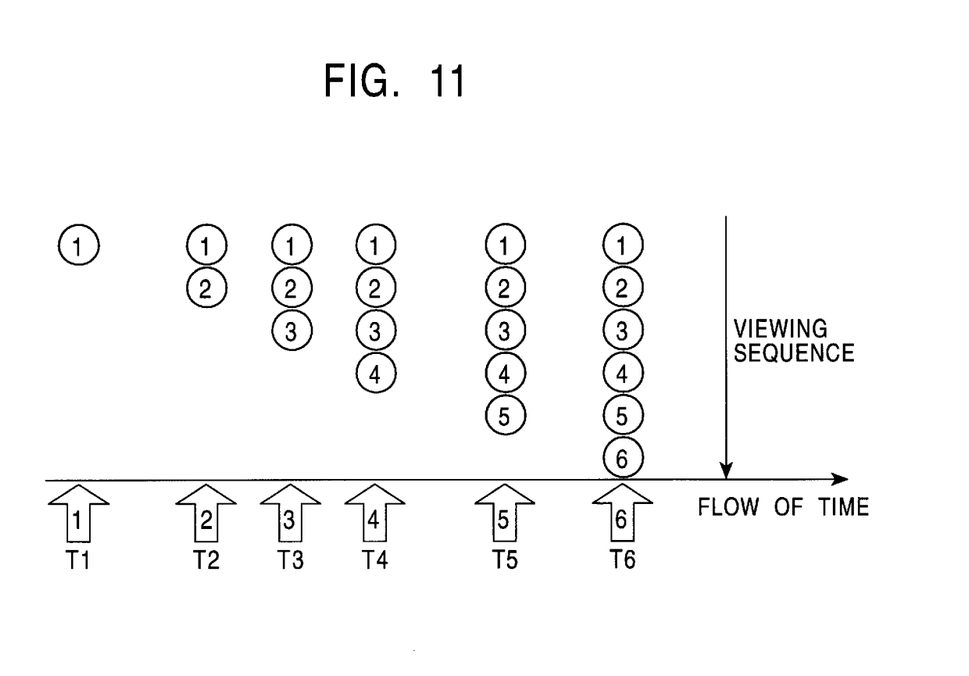
FIG. 11 is an illustration of a state in which control sub-information is stored.

FIG. 11 shows a state in which the control sub-information is stored in the database 22. The control sub-information is created by the transmission apparatus 1 for each of the contents (including content created inside the receiving apparatus 5) in the viewing scene (frames), and is distributed to the receiving apparatus 5. At time T1, the control sub-information of the content used in the viewing scene at time t' is stored in the database 22 of the receiving apparatus 5. Next, at time T2, the control sub-information of the content used in the viewing scene at time t2' is received, and the control sub-information is stored so as to be linked with the control sub-information received at time T1. Hereafter, each control sub-information received at each time is stored in a form linked with the control sub-information received at the previous time. That is, when a program is to be constructed from the content stored in the database 22, the receiving apparatus 5 must refer to the link of the control sub-information in both the above-described live broadcast and the rebroadcast.

Although the content stored in the database 22 of the receiving apparatus 5 is reconstructed in accordance with the control sub-information transmitted from the transmission apparatus 1, a user (for example, an owner of the receiving apparatus 5) may operate the receiving apparatus 5 in order to reconstruct the content, or reconstruction of content by the user may be prohibited.

In addition to information recording media, such as magnetic disks or CD-ROMs, examples of distribution media which provide processing programs for performing the above-described processing for the user include network transmission media, such as the Internet, or digital satellite.

According to the transmission apparatus and method, and the distribution medium in accordance with the present invention, as described above, a transmission signal is divided, an indicator is added to the divided signals, information indicating the viewing relationships of the divided signals is created, and the divided signals and the information are transmitted. This makes it possible to reduce the amount of data transmitted and to effectively use the digital communication band.

According to the receiving apparatus and method, and the distribution medium in accordance with another aspect of the present invention, divided signals, and information indicating the viewing relationships of the divided signals are received, the divided signals and the information are stored, and the stored divided signals are reconstructed in accordance with the information. This makes it possible to easily reuse the stored content.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A transmission apparatus for transmitting digital signals, said transmission apparatus comprising:
    addition means for dividing a transmission signal and for adding indicators to the divided signals;
    creation means for creating information which specifies viewing relationships among said respective divided signals; said information including time information and speed information for using said divided signals; and
    transmission means for transmitting said divided signals to which indicators are added by said addition means and said information created by said creation means; wherein said divided signals are transmitted earlier than a time indicated by said time information; and when said divided signals have been previously transmitted, said transmission means transmits only the information created by said creation means and not the previously transmitted divided signals.

2. A transmission method for transmitting digital signals, said transmission method comprising:
    an addition step for dividing a transmission signal and for adding indicators to the divided signals;
    a creation step for creating information which specifies viewing relationships among said respective divided signals; said information including time information and speed information for using said divided signals; and
    a transmission step for transmitting said divided signals to which indicators are added in said addition step and said information created in said creation step; wherein said divided signals are transmitted earlier than a time indicated by said time information; and when said divided signals have been previously transmitted, said transmission step transmits only the information created by said creation step and not the previously transmitted divided signals.

3. A distribution medium for providing a processor-readable program to a transmission apparatus for transmitting digital signals, said program comprising:
    an addition step for dividing a transmission signal and for adding indicators to the divided signals;
    a creation step for creating information which specifies viewing relationship among said respective divided signals; said information including time information and speed information for using said divided signals; and
    a transmission step for transmitting said divided signals to which indicators are added in said addition step and said information created in said creation step; wherein said divided signals are transmitted earlier than a time indicated by said time information; and when said divided signals have been previously transmitted, said transmission step transmits only the information created by said creation step and not the previously transmitted divided signals.

4. A receiving apparatus for receiving digital signals, said receiving apparatus comprising:
    receiving means for receiving divided signals and information which specifies viewing relationships among said divided signals; said information including time information and speed information for using said divided signals; wherein said divided signals are received earlier than a time indicated by said time information; and when said divided signals have been previously received, said receiving means receives only the information and not the previously received divided signals;
    storage means for storing said divided signals received by said receiving means, and said information; and
    construction means for reconstructing said divided signals stored by said storage means in accordance with said information.

5. A receiving method for receiving digital signals, said receiving method comprising:
    a receiving step for receiving divided signals and information which specifies viewing relationships among said divided signals; said information including time information and speed information for using said divided signals; said information including time information and speed information for using said divided signals; wherein said divided signals are received earlier than a time indicated by said time information; and when said divided signals have been previously received, said receiving step receives only the information and not the previously received divided signals;

a storing step for storing said divided signals received in said receiving step, and said information; and a construction step for reconstructing said divided signals stored in said storing step in accordance with said information.

6. A distribution medium for providing a processor-readable program to a receiving apparatus for receiving digital signals, said program comprising:

a receiving step for receiving divided signals and information which specifies viewing relationships among said divided signals; said information including time information and speed information for using said divided signals; said information including time information and speed information for using said divided signals; wherein said divided signals are received earlier than a time indicated by said time information; and when said divided signals have been previously received, said receiving step receives only the information and not the previously received divided signals;

a storing step for storing said divided signals received in said receiving step, and said information; and a construction step for reconstructing said divided signals stored in said storing step in accordance with said information.

* * * * *